(No Model.)
C. HOFFMANN & L. EBERT.
MEANS FOR BOILING, COOLING, &c., BEER.
No. 411,337. Patented Sept. 17, 1889.
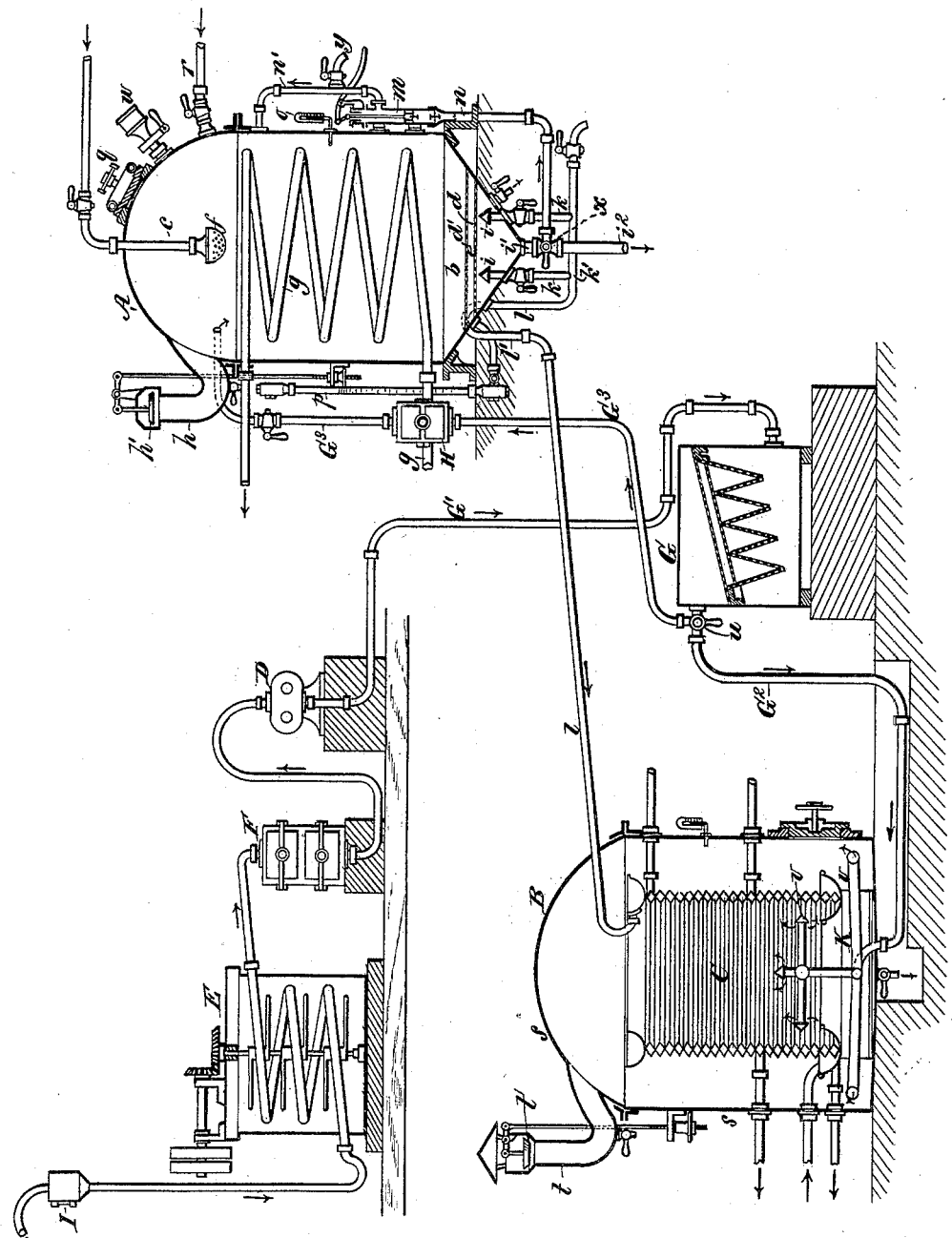
Witnesses,
Robert Everett
Percy B. Hills.
Inventors.
Constantin Hoffmann
Lorenz Ebert.
By James L. Norris
Atty.

UNITED STATES PATENT OFFICE.

CONSTANTIN HOFFMANN, OF EISFELT, SAXE-MEININGEN, AND LORENZ EBERT, OF SCHEIBE, SCHWARZBURG-RUDOLSTADT, GERMANY.

MEANS FOR BOILING, COOLING, &c., BEER.

SPECIFICATION forming part of Letters Patent No. 411,337, dated September 17, 1889.

Application filed March 6, 1888. Serial No. 266,386. (No model.) Patented in Germany October 17, 1887, No. 41,960.

*To all whom it may concern:*

Be it known that we, CONSTANTIN HOFFMANN and LORENZ EBERT, the former a subject of the Duke of Saxe-Meiningen, the latter a subject of the King of Bavaria, German Empire, the former residing at Steudach, Eisfelt, Saxe-Meiningen, the latter residing at Scheibe, Schwarzburg-Rudolstadt, Germany, have invented new and useful Means for Boiling, Sterilizing, and Cooling Beer, (for which we have obtained a patent in Germany, No. 41,960, bearing date October 17, 1887,) of which the following is a specification, reference being had to the accompanying drawing.

The present invention relates to apparatus for sterilizing and cooling beer-wort, whereby the latter is kept completely protected against any injurious actions of the atmosphere during the whole cooling process—that is to say, from the boiling-copper to the fermenting-vat. According to the present cooling process the beer-wort is cooled either on coolers or by means of special apparatus. This takes place with the admission of ordinary atmospheric air, which has a deleterious effect upon or infects the beer-wort. That such an infection frequently takes place is proved by the many changes in the beer-wort during the cooling processes heretofore practiced, and by the various abnormal phenomena of fermentation which occur despite the employment of sound yeast. In order to obviate these inconveniences, we provide the known cooling apparatus with a casing which can be hermetically closed and bring the beer-wort, which runs boiling hot, and therefore free from germs or sprout, to the cooling apparatus into contact with sterilized air. By the introduction of sterilized air into the casing of the cooling apparatus at a certain overpressure during the cooling the beer-wort remains quite free from germs or sprout, and after that the air necessary for the fermentation is introduced according to requirements and the exhalation of the same is effected.

The invention consists in the features of construction and combination of devices hereinafter described and claimed, reference being made to the accompanying drawing, in which the figure is a sectional elevation of the apparatuses illustrating the invention.

In the drawing, the letter A indicates the wort sterilizing and filtering apparatus; C, the cooling apparatus; B, the closed casing thereof; E, the air-cooling apparatus; F, the air-drying apparatus; G H, the air-filters, and D an air-forcing apparatus, such as a blower.

The sterilizing and filtering apparatus A consists of an iron or copper vessel $a$, which can be hermetically closed and can withstand a pressure of several atmospheres. The bottom $b$ is tapering and the head $c$ is hemispherical. In the interior, above the taper bottom, are two superposed filters $d$ $d'$, the intermediate space $e$ between them being filled with sterilized filtering material (chopped wood-wool) and hops. In the vessel $a$ is arranged a steam-coil $g$, and in the hemispherical head $c$ a sprinkling-rose $f$. On the outside of the apparatus is an exhalation-pipe or delivery-pipe $h$, with a valve $h'$, in order to close the interior of the apparatus wholly or partly against the outer air, and projecting through the tapering or conical bottom is a pipe or pipes $k$, connected with a collecting-pipe $k'$, which communicates with a goose-neck or siphon-pipe $l$ $l'$, leading into the upper part of the casing B of the cooling apparatus C. The pipes $k$ extend up into the vessel $a$, but terminate directly below the filter-plates $d$ $d'$, for the purpose of carrying off the clarified wort to the collecting-pipe $k'$, and to prevent any solid parts entering said pipes $k$ their upper ends are provided with hoods $i$. An outlet-pipe $i'$ extends from the extreme lower portion of the conical bottom $b$, and connects by a branch pipe $n$ with the lower end of a pump $m$, fixed to the exterior of the vessel $a$, the upper end of said pump connecting by a pipe $n'$ with the interior of the vessel $a$ at a point considerably above the filter-plates $d$ $d'$. The pipes $k$ take the clarified wort from a point adjacent to the filter-plates, while the turbid liquid collects in the extreme lower portion of the conical bottom $b$, which is considerably below the upper ends or receiving-mouths of the pipes $k$. By operating the pump $m$ the turbid liquid below the receiving-mouths of the pipes $k$ will be withdrawn from the extreme lower portion of the conical bottom $b$ and forced into the vessel $a$ above the filter-plates $d$ $d'$. The collecting-pipe $k'$ is provided with a cock $k^2$, by which the vessel $a$ can be conveniently emptied and cleaned by water entering the vessel under pressure. The remainder of the fittings consists of the necessary cocks and pipes and other apparatus, of which may be specially mentioned a thermometer $o$, a beer-level gage $p$, a manhole $q$, an admission-pipe $r$, with a cock, for the entering beer-wort, &c.

The casing B of the cooling apparatus C consists of an iron or copper casing $s$, capable of being hermetically closed and withstanding a pressure of several atmospheres which surrounds the surface cooling apparatus C at a suitable distance. The said casing $s$ is provided on the outside with an outlet-pipe $t$, having the adjustable valve $t'$. The other fittings of the casing consist of the necessary outlet and inlet pipes, cocks, thermometers, man-holes, and the like, according to the kind of the cooling apparatus to be used. These parts, to the features of which no special importance is attached, can be varied. Care must be taken that all the parts which lead into or from the apparatus shall be connected hermetically with the casing.

The cooling, drying, and filtering device for sterilized air consists of a blower D, which sucks the air first through a preliminary cotton filter I, then through an air-cooler F and an air-drier E, suitably filled with glowed charcoal. The blower connects with the air-filter G by a pipe G' and with the vessel $a$ by a pipe $G^3$, containing an air-filter H, and also with an air-distributing device K in the lower part of the closed casing B by a pipe $G^2$. A three-way cock $u$ is arranged at the junction of the pipes $G^2$ and $G^3$, so that by turning said cock in the proper direction the sterilized air from the filter G may be forced either through the filter H into the vessel $a$ by the pipe $G^3$ or into the casing B by the pipe $G^2$ and air-distributer K. This distributer is arranged in the casing B of the cooling apparatus C. It consists of several pipes having suitably-shaped nozzles or orifices $v$ $v$ for the purpose of uniformly distributing the sterilized air entering the casing around the cooling apparatus. It may here be specially stated that the parts D E F G H I, which serve to filter and sterilize the air, can be of any desired construction, as we do not limit ourselves to definite forms and sizes of these apparatus.

The boiling, cooling, and sterilizing of the beer-wort is mainly effected in the following manner: The beer-wort ready boiled is conducted from the boiling-copper, together with the hops, by means of the pipe $r$ into the vessel $a$, which is filled with sterilized air. At the same time sterilized air is forced into the apparatus by the blower D, so that a pressure is produced, which is regulated by means of the valve $h'$ in the outlet-pipe $h$ in such a manner that no ordinary air can pass into the vessel $a$. The beer-wort can again be boiled by the steam-coil $g$. The steam thereby generated is led off through a pipe $h$ according to requirements. The beer-wort is now left to rest and all the openings of the vessel are hermetically closed. The hops take their place upon the upper filter-plate $d'$, and after about an hour's rest the beer-wort is filtered through the hops and through the sterilized filtering material contained between the two filter-plates $d$ $d'$. By the pipes $k$ $k'$ the clarified beer-wort is drawn from the apparatus by means of the siphon-pipe $l$ $l'$ and passed through the swan-neck pipe $l$, connected therewith, into the hermetically-closed casing B on to the sprinkling apparatus C. When the beer-level gage $p$ indicates no wort, the hop is sprinkled over with hot water, free from germs or sprouts, by means of the sprinkling-rose $f$, thereby removing all the beer-wort from the hop. During the cooling of the beer-wort sterilized air is conducted and uniformly distributed in the casing B through the air introducing and distributing device K, so that a pressure is produced whereby the oxygen necessary for the fermentation is conducted to the beer-wort, and exhalation is caused according to requirements by the use of the outlet-pipe $t$. The water of condensation flows on the one hand into the pipe $t$, whence it can be let off through a cock, and on the other hand to the bottom of the casing. The beer-wort thus treated flows (free from turbidness, and also free from bacteria and sprouts) into the fermenting-vats. The vessel $a$ can be used as a steam brewing-copper, for which purpose I provide the outlet-pipe $i'$, with an extension $i^2$, and arrange a three-way cock $x$ at the junction of the branch pipe $n$ with the outlet-pipe $i'$. Now, before the filtering proper of the beer-wort above the hop takes place the turbid beer-wort below the filters $d$ $d'$ is pumped out and in again above until it flows free from any turbidness, which can be observed by a test-cock $y$ on a pipe $n$ or $n'$.

The cleaning of the apparatus from the turbid parts remaining behind and also the rinsing and running off of the wash or rinsing water for the apparatus, pump, and other parts can take place by means of the three-way cock $x$. The filtering apparatus A can therefore serve for sterilizing and filtering the beer-wort and at the same time serve as a steam brewing-copper, enabling it to be hermetically closed, in order to enable the wort with hops to be completely boiled in the same.

What we claim is—

1. The combination of the air-tight wort-boiling vessel $a$, the filtering-plates $d$ $d'$, supported above the extreme bottom thereof, the collecting-pipe $k'$, having a branch pipe $k$, communicating at its upper end with the vessel between the extreme lower end of the latter and the filtering-plates for carrying off the clarified wort, and a pump m, communicating with the interior of the air-tight vessel at a point above the filtering-plates and at a point below the upper end of the branch pipe of the collecting-pipe for withdrawing the turbid liquid from below the filtering-plates and the upper end of the branch pipe and forcing it into the air-tight vessel above the filtering-plates, substantially as described.

2. An apparatus for boiling and sterilizing beer, consisting of an air-tight vessel a, filtering-plates d d', supported above the extreme bottom thereof, a sterilized-air-forcing apparatus for introducing sterilized air into the air-tight vessel, the collecting-pipe k', having a branch k, communicating at its upper end with the vessel between the extreme lower end of the latter and the filtering-plates for carrying off the clarified wort, and a pump m, communicating with the air-tight vessel for removing the turbid wort from a point below the filtering-plates and the upper end of the branch pipe while the supply of sterilized air to the vessel is shut off, and forcing such turbid liquid into the air-tight vessel above the filtering-plates, substantially as described.

3. An apparatus for boiling and sterilizing beer-wort, consisting of an air-tight vessel a, filtering-plates d d', supported above the extreme bottom thereof, a sterilized-air-forcing apparatus for introducing sterilized air into the air-tight vessel, the collecting-pipe k', having a branch pipe k, communicating at its upper end with the vessel between the extreme lower end of the latter and the filtering-plates for carrying off the clarified wort, a pump m, communicating with the air-tight vessel at a point above the filtering-plates and at a point below the upper end of the branch pipe of the collecting-pipe for withdrawing the turbid liquid from below the filtering-plates and the upper end of the branch pipe while the supply of sterilized air to the vessel is shut off, and forcing such turbid liquid into the air-tight vessel above the filtering-plates therein, the hermetically-closed casing B, and a pipe connected with the collecting-pipe for conducting the hot clarified beer-wort into said closed casing for cooling the beer-wort, substantially as described.

4. The combination, with the wort-boiling vessel a, having the filtering-plates d d' located therein, of the external pump m, having pipes n n', connected, respectively, with the vessel below and above the filtering-plates for withdrawing the turbid liquid from below the filtering-plates and forcing it into the vessel above said plates, substantially as described.

In witness whereof we have signed the foregoing specification this 4th day of January, 1888.

CONSTANTIN HOFFMANN.
LORENZ EBERT.

Witnesses:
VICTOR ESCHER,
ALBERT HAENCH.